(12) United States Patent
Iyer et al.

(10) Patent No.: US 11,688,853 B2
(45) Date of Patent: Jun. 27, 2023

(54) METAL-FREE HIGH-VOLTAGE CATHODES FOR SECONDARY LITHIUM-ION AND ALKALI-ION BATTERIES

(71) Applicant: NRGTEK, Inc., Orange, CA (US)

(72) Inventors: Subramanian Iyer, Yorba Linda, CA (US); Ramesh Palanisamy, Anaheim, CA (US)

(73) Assignee: NRGTEK, Inc., Orange, CA (US)

(*) Notice: Subject to any disclaimer, the term of this patent is extended or adjusted under 35 U.S.C. 154(b) by 127 days.

(21) Appl. No.: 17/148,446

(22) Filed: Jan. 13, 2021

(65) Prior Publication Data

US 2022/0223869 A1 Jul. 14, 2022

(51) Int. Cl.

| | | |
|---|---|---|
| H01M 10/00 | (2006.01) | |
| H01M 4/58 | (2010.01) | |
| H01M 4/587 | (2010.01) | |
| H01M 10/0525 | (2010.01) | |
| H01M 4/66 | (2006.01) | |
| H01M 10/054 | (2010.01) | |
| H01M 10/0569 | (2010.01) | |
| H01M 4/70 | (2006.01) | |
| H01M 4/02 | (2006.01) | |

(52) U.S. Cl.
CPC ......... H01M 4/5825 (2013.01); H01M 4/587 (2013.01); H01M 4/663 (2013.01); H01M 4/70 (2013.01); H01M 10/054 (2013.01); H01M 10/0525 (2013.01); H01M 10/0569 (2013.01); H01M 2004/021 (2013.01); H01M 2300/0025 (2013.01)

(58) Field of Classification Search
CPC ......... H01M 10/0568; H01M 10/0525; H01M 10/02569; H01M 10/44; H01M 4/583
See application file for complete search history.

(56) References Cited

U.S. PATENT DOCUMENTS

| | | | |
|---|---|---|---|
| 2010/0119956 A1* | 5/2010 | Tokuda | H01M 4/133 |
| | | | 429/339 |
| 2015/0017322 A1 | 1/2015 | Reynaud et al. | |
| 2020/0052350 A1* | 2/2020 | Zhamu | H01M 4/625 |
| 2020/0176801 A1 | 6/2020 | Iyer | |

FOREIGN PATENT DOCUMENTS

JP  2020145188 A  * 9/2020

OTHER PUBLICATIONS

Matsura JP 2020145188A, Positive Electrode Active Material for Lithium Ion Secondary Battery, Method for Producing Positive Electrode Active Material for Lithium Ion Secondary Battery, and Lithium Ion Secondary Battery, See the contract. (Year: 2020).*

(Continued)

*Primary Examiner* — Cynthia H Kelly
*Assistant Examiner* — Monique M Wills
(74) *Attorney, Agent, or Firm* — UltimatEdge IP Law Group, P.C.; Dean G. Stathakis; Vito A. Canuso, III

(57) ABSTRACT

An alkali-ion battery is provided that includes an anhydrous alkaline salt as an active cathode material, where the alkaline salt may be, for example, a lithium sulfate salt, sodium sulfate salt or potassium sulfate salt, as the active cathode material. In some such batteries, the inter-conversion of sulfate to persulfate occurs during charging and discharging of the battery, respectively.

1 Claim, 6 Drawing Sheets

| | | | |
|---|---|---|---|
| Molecular Weight of $Li_2SO_4$ = | | 109.94 | |
| Number of $Li^+$ (n) ions available/mole = | | 1 | |
| Faraday constant = | | 96485 | Coloumbs |
| Theoretical Capacity | = nF/Mol.Wt | 877.6151 | Coloumbs |
| | Converted | 243.782 | mAh/g |

(56) References Cited

OTHER PUBLICATIONS

WIPO, PCT Form ISA210 International Search Report for International Patent Application Serial No. PCT/US2022/011865, pp. 3 (May 13, 2022).
WIPO, PCT Form ISA237 Written Opinion of the International Searching Authority for International Patent Application Serial No. PCT/US2022/011865, pp. 6 (May 13, 2022).

* cited by examiner

| | | | |
|---|---|---|---|
| Molecular Weight of $Li_2SO_4$ = | | 109.94 | |
| Number of $Li^+$ (n) ions available/mole = | | 1 | |
| Faraday constant = | | 96485 | Coloumbs |
| Theoretical Capacity | = nF/Mol.Wt | 877.6151 | Coloumbs |
| | Converted | 243.782 | mAh/g |

FIG. 1

$$S_2O_8^{-2} + 2H^+ + 2e^- \longrightarrow 2HSO_4^- \qquad E = 2.12V$$

$$S_2O_8^{-2} + 2H_2O \xrightarrow{H^+} 2HSO_4^{-2} + H_2O_2$$

$$S_2O_8^{-2} + H_2O \xrightarrow{H^+} HSO_4^- + HSO_5^-$$

Neutral (pH 3 to 7)
$$S_2O_8^{-2} + H_2O \longrightarrow 2HSO_4^- + 1/2O_2$$

Dilute acid (pH > 0.3; [H+] < 0.5M)
$$S_2O_8^{-2} + 2H_2O \longrightarrow 2HSO_4^- + H_2O_2$$

Strong acid ([H+] > 0.5M)
$$S_2O_8^{-2} + H_2O \xrightarrow{H^+} HSO_4^- + HSO_5^-$$

Alkaline (pH > 13)
$$S_2O_8^{-2} + OH^- \longrightarrow HSO_4^- + SO_4^{-2} + 1/2O_2$$

FIG. 2

Table 2: Results of various experiments for the proposed Lithium-ion battery system.

| | Anode | Cathode | Electrolyte | Solvent | Binder | Separator | Failure Mode/Successful 5V LiB system |
|---|---|---|---|---|---|---|---|
| 1 | Graphite | Lithium sulfate + carbon | LiClO$_4$ | Dimethyl sulfoxide, DMSO | PVDF | Microporous Teflon | Solvent breakdown at 2.5 V, low EW |
| 2 | Graphite | Lithium sulfate + carbon | LiTFSI | Acetonitrile, ACN | PVDF | Cellulose felt matrix | ACN oxidized by persulfate |
| 3 | Graphite | Lithium sulfate + carbon | LiPF$_6$ | Ethylene carbonate, EC + Dimethyl carbonate, DMC | PVDF | Cellulose felt matrix | Moisture sensitive, HF formation |
| 4 | Graphite on Cu foil | Lithium sulfate + carbon | LiClO$_4$ | Propylene carbonate, PC | PVDF | Cellulose felt matrix | Graphite delamination from Cu foil |
| 5 | Graphite on Cu foil | Lithium sulfate + carbon | LiClO$_4$ | PC + ACN | PVDF | Microporous PVDF | ACN oxidized by persulfate, Graphite delamination from Cu foil |
| 6 | Graphite on Cu foil | Lithium sulfate + carbon | LiClO$_4$ | Sulfolane + PC | PVDF | Microporous PVDF | Graphite delamination from Cu foil |
| 7 | Graphite on Cu foil | Lithium sulfate + carbon | LiClO$_4$ | Sulfolane + PC + EC | PVDF | Microporous PVDF | 1 Charge/discharge cycle, Gr delamination |
| 8 | Graphite on Cu foil | Lithium sulfate + carbon | LiClO$_4$ | Sulfolane + PC + EC | PDMS | Microporous PVDF | Successful multiple charge/discharge cycles |

FIG. 3

METAL-FREE HIGH-VOLTAGE CATHODES FOR SECONDARY LITHIUM-ION AND ALKALI-ION BATTERIES

BACKGROUND

Lithium has long received much attention as a promising anode material for rechargeable batteries. The interest in this alkali metal has arisen from the combination of its two unique properties: (1) it is the most electronegative metal (−3.0 V vs SHE), and (2) it is the lightest metal (0.534 g cm−3). The former confers upon it a negative potential that translates into high cell voltage when matched with certain cathodes, and the latter makes it an anode of high specific capacity (3.86 Ah/g). Commercial lithium-ion batteries use lithium ions intercalated in a graphitic anode, while the cathode is constructed from layered oxides like lithiated cobalt oxide ($LiCoO_2$) or LiNiMnCo (NMC) of varying compositions, or spinels like LiMnNiO, or alternatively, lithiated metal phosphates. During charging, the lithium ion from the lithiated metal oxide is driven into the graphitic anode, resulting in an intercalation compound of lithiated graphite ($C_6Li$). The lithium at both electrodes exists in an ionic form, hence the term Li-ion battery. The capacity of the graphitic anode is around 372 mAh/gm, while the capacity of the cathode material ($LiCoO_2$) is around 170 mAh/gm, leading to a severe mismatch between the two electrodes. The spinels and phosphates have even lower capacity, less than 110 mAh/gm. Several other cathodic materials have been investigated over the last couple of decades, ranging from nickel oxides, manganese oxides, polysulfides and iron phosphates and combinations thereof, but with only incremental improvements in cathode capacity.

Lithium metal is not used by itself as the anode material in a battery due to safety issues. The failure of lithium as an anode due to dendrite formation prompted the search for a way to circumvent the drastic morphological change of the anode during cell cycling. As a result, "host-guest" chemistry was developed. Also known as intercalation-, or insertion-type, electrodes, this concept of reversible chemistry has been applied earlier to cathode materials for lithium batteries, as represented by the trail-blazing work of Whittingham and the significant improvements by Goodenough et al. and others. Most of the host materials are transition metal oxides or chalcogenides with stable crystal lattices, and their layer or tunnel structures provide the pathways for guest ions such as the lithium ion to diffuse. By injecting or extracting electrons, the redox reactions occur on the host lattice while mobile guest ions intercalate into or de-intercalate from the host matrix to compensate for regional electroneutrality. During the whole intercalation and deintercalation cycle, there are no Faradaic changes in the "guest ion".

A similar intercalation host is graphite, used as an anode material for commercial lithium-ion batteries, employing such intercalation cathodes and anodes to enable the lithium ion to shuttle back and forth between the electrodes without the presence of lithium metal. In the charged state of these carbonaceous anodes, lithium exists in its ionic rather than metallic state, thus eliminating any possibility of dendrite lithium. The advantage of this new host is highlighted by the low cost of carbon and the high lithium-ion activity in the intercalation compound; the latter renders an anode potential close to that of lithium metal and minimizes the energetic penalty, with a high specific energy capacity of 3.70 Ah/g.

The employment of new materials and novel engineering designs has pushed the cycle life, energy, and power density of lithium-ion battery technology to more than 2000 cycles, 160 Wh/kg, and 5000 W/kg, respectively, with the application of more potent 4.0 V cathode materials ($Li_xMO_2$, M=Mn, Ni, or Co) in lithium-ion secondary batteries. Lithium-ion batteries have become the dominant rechargeable energy storage devices owing to their high energy density and long lifetime. The most studied cathode materials, such as layered $LiCoO_2$ and $LiNi_{1/3}Mn_{1/3}Co_{1/3}O_2$ (NMC111), are mainly based on cobalt redox processes. However, the limited availability, uneven distribution and toxicity of cobalt have made it desirable to explore new-generation cathodes. In this respect, iron-based polyanionic compounds are attractive cathode materials for large-scale energy storage applications given that using naturally abundant iron as a redox center will effectively alleviate the restrictions of limited resources and decrease the energy cost. More importantly, oxygen atoms are stabilized in the polyanions (e.g. $(PO_4)^{3-}$) via the strong covalent bonds, which could significantly reduce the risk of oxygen evolution and increase the cycling stability. The successful use of lithium iron phosphate ($LiFePO_4$) as a cathode for lithium-ion batteries due to its low cost, high safety and long cycling life has extensively stimulated the investigations of a range of polyanionic compounds for cathode materials.

SUMMARY

With some embodiments of the present invention, an alkali-ion battery is provided that comprises an anhydrous alkali salt as an active cathode material, whereby the anhydrous alkali salt is insoluble in organic electrolytes. In some embodiments of the alkali-ion battery, the alkali salt comprises a lithium salt, wherein lithium ions are extracted and lithiated into an anode. In some embodiments, the anode comprises graphite. In some embodiments, the lithium salt comprises lithium sulfate. In some embodiments, the inter-conversion of lithium sulfate to lithium persulfate, and vice versa, occurs during charging and discharging of the battery, respectively. In some embodiments, alkali-ion battery further comprises a high-voltage electrolyte. In some embodiments, the electrolyte comprises sulfolane.

In some embodiments, of the alkali-ion battery, the alkali salt comprises either sodium sulfate or potassium sulfate as the active cathode material, wherein sodium or potassium ions are extracted from their sulfate salts for insertion into an anode. In some embodiments, the inter-conversion of sulfate to persulfate occurs during charging and discharging of the battery, respectively.

With some embodiments of the present invention, a high-voltage cathode is provided that comprises anhydrous alkali sulfate layers embedded onto a porous current collector. In some embodiments, the alkali sulfate layers comprise lithium sulfate layers. In some embodiments, the porous current collector comprises either porous carbon cloth or porous carbon paper.

BRIEF DESCRIPTION OF THE FIGURES

The aforementioned objects and advantages of the present invention, as well as additional objects and advantages thereof, will be more fully understood hereinafter as a result of a detailed description of a preferred embodiment when taken in conjunction with the following drawings in which:

FIG. 1 shows a table reflecting the theoretical capacity of lithium sulfate;

FIG. 2 shows undesirable tramp reactions for the proposed lithium-ion battery using sulfate/persulfate chemistry, some of which are irreversible;

FIG. 3 shows the results of various experiments to make a lithium-ion rechargeable battery system;

DETAILED DESCRIPTION OF CERTAIN EMBODIMENTS

Figure 4:
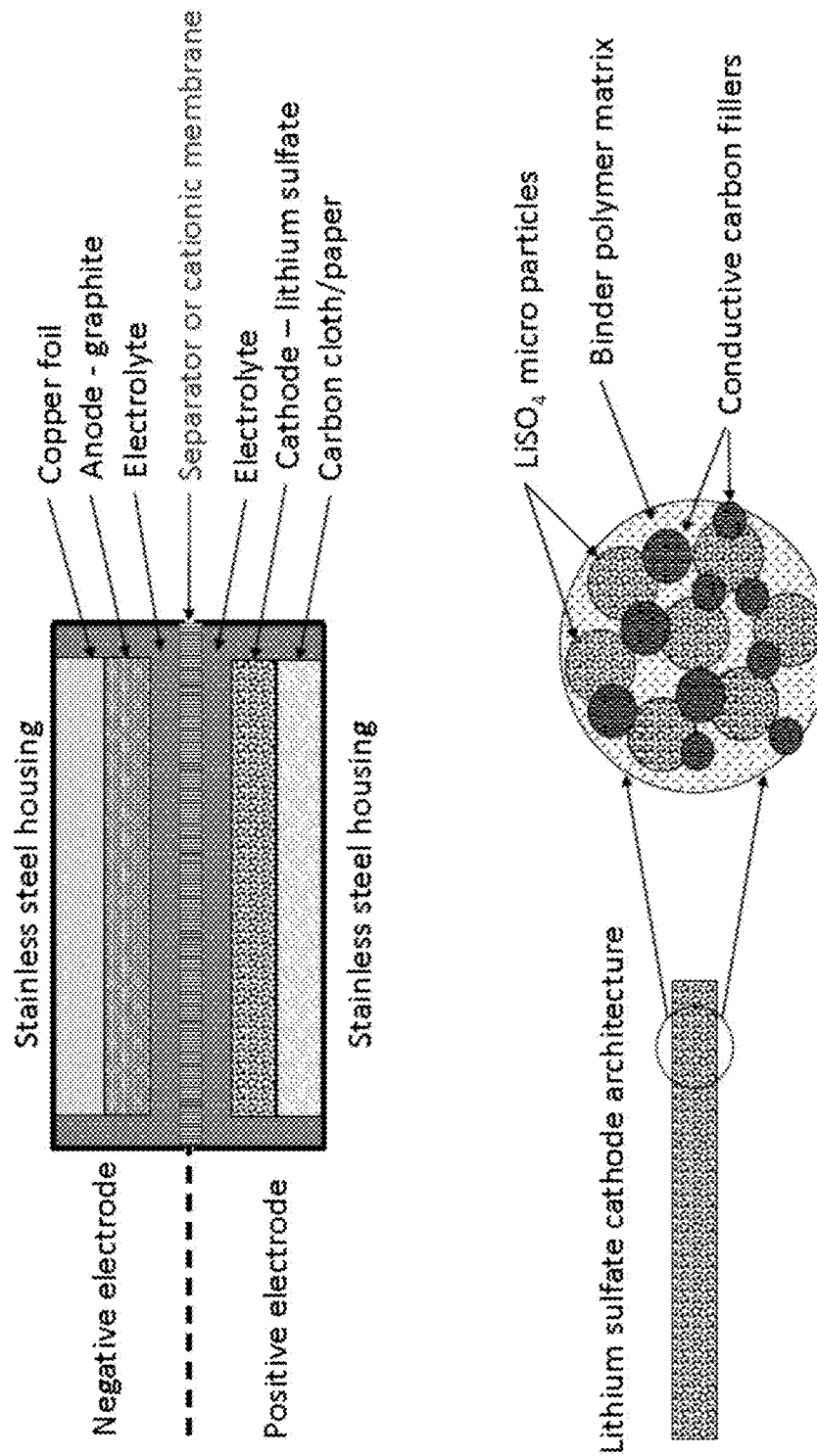
FIG. 4 shows one embodiment of the inventive lithium-ion battery architecture, as tested.

With embodiments of the present invention, an alkali-ion battery is provided in which an alkali salt is used as an active cathode material, which exhibits high voltage chemistry and recharging characteristics. The active cathode material comprises in one embodiment an anionic component of a lithium salt, but may comprise other salts, as discussed below. In one embodiment, the cathode active material comprises the sulfate salt of lithium, which is electrochemically converted to lithium peroxidisulfate (also known as lithium persulfate) during lithium ion extraction, which is charged into a graphite or lithium/alloy anode. Lithium ion storage and subsequent charge/discharge is accomplished by example by inter-conversion of solid-state sulfate/persulfate salt matrices as the cathode-active material on graphite/lithium alloy substrates. The use of lithium sulfate/peroxidisulfate (also known as persulfate) reversible electrochemistry can yield a high-voltage lithium-ion battery. The detailed electrochemical charging and discharging reactions are as follows: $S_2O_8^{2-} \leftrightarrow 2SO_4^{2-}$, with a resulting cell voltage of 4.85 V. The complete electrochemical reactions are as follows:

Charging Mode:
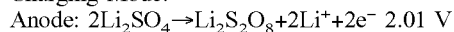
Anode: $2Li_2SO_4 \rightarrow Li_2S_2O_8 + 2Li^+ + 2e^-$ 2.01 V
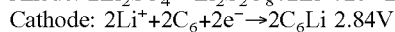
Cathode: $2Li^+ + 2C_6 + 2e^- \rightarrow 2C_6Li$ 2.84V
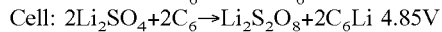
Cell: $2Li_2SO_4 + 2C_6 \rightarrow Li_2S_2O_8 + 2C_6Li$ 4.85V
Discharge Mode:
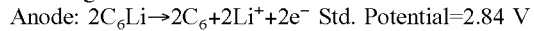
Anode: $2C_6Li \rightarrow 2C_6 + 2Li^+ + 2e^-$ Std. Potential=2.84 V
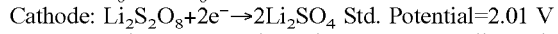
Cathode: $Li_2S_2O_8 + 2e^- \rightarrow 2Li_2SO_4$ Std. Potential=2.01 V
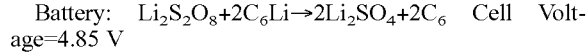
Battery: $Li_2S_2O_8 + 2C_6Li \rightarrow 2Li_2SO_4 + 2C_6$ Cell Voltage=4.85 V Lithium persulfate and lithium sulfate are very insoluble in aprotic organic solvents. Thus, lithium sulfate powder can be impregnated onto porous carbon paper with appropriate binders and solvents (like polyvinylidene fluoride, PVDF dissolved in n-methylpyrrolidine, NMP). During charging mode, lithium ions are extracted from the lithium sulfate electrode and intercalated into the graphite counter-electrode, while converting the sulfate salt into a persulfate salt. During discharge, lithium ions are de-intercalated from the graphite electrode and re-inserted into the crystalline matrix of the lithium persulfate electrode, converting it back into lithium sulfate.

The lithium persulfate (or peroxidisulfate) salt is non-hygroscopic, non-combustible, and can be stored for long time periods (≈10 years) as a salt or concentrated solution. The oxygen in the persulfate (in a peroxide state) can be released easily to assist in oxidation. The higher standard potential of persulfate (2.010V vs. SHE) and its strong oxidizing power (intermediate between hydrogen peroxide and ozone, without their inherent stability issues and short half-life) provides one of the highest operating voltages in aqueous and/or non-aqueous systems.

Replacement of the layered metal oxide cathode, (like lithiated cobalt oxide), by lithium sulfate on a suitable catalyzed current collector (like porous platinized carbon paper, can resolve the cathode capacity limitations of lithiated metal oxide cathodes, leading to high energy density. The potential cell voltages are much higher than current Lithium-ion batteries (3.25-3.5 volts), leading to a high power density for the integrated cell. As reflected in FIG. 1, the theoretical capacity of lithium sulfate is considerably higher, at 240 mAh/gm, than lithiated metal oxide cathodes (≈170 mAh/gm) and much better than the lithium iron phosphate system.

Lithium sulfate and lithium persulfate have a sphenoidal monoclinic crystal structure. Lithium sulfate crystals have edge lengths of a=8.23 Å b=4.95 Å c=8.47 Å R=107.98°, a coordination geometry of tetrahedral at the sulfur atoms, and with lithium atoms at the corners, enabling easy extraction of lithium ions when electrochemically converted from the sulfate structure to the persulfate structure during charging operations. Similarly, lithium ion insertion is also easily facilitated to the sulfate structure during discharging operations, converting the persulfate structure to the sulfate structure. The strong bonds between the sulfur and oxygen atoms enable the lithium ions to be loosely bonded within the crystalline matrix. The weaker lithium bonds allow for the lithium ions to easily move from site to site, not needing to break strong bonds to do so. The monocline structure of lithium sulfate and lithium persulfate with lithium atoms at the corners, additionally lowers the energy required for lithium ions to move from site to site. These two factors allow for the lithium ions to diffuse quickly and easily through the crystalline structure.

For the proposed lithium-ion battery, it is desired that tramp reactions are prevented. Several tramp reactions can happen in protic solvents, or in the presence of even trace amounts of moisture, or binders having hydrogen bonding structures. Referring to FIG. 2, undesirable tramp reactions are shown for the proposed lithium-ion battery using sulfate/persulfate chemistry, some of which are irreversible.

Similarly, trace metal impurities in the cathode structure also need to be very closely controlled, due the strong oxidizing action of persulfates. This prevents the use of common cathode structures and current collectors using stainless steel or copper meshes. Carbon-based and graphite-based current collectors and powders have been found to be of sufficient efficiency and inertness during the conversion of sulfates to persulfates, while enhancing the stability of the persulfate salt formed.

The high charging voltage of the proposed Li—SO$_4$ lithium-ion battery, in excess of 4.85 volts, requires electrolyte-solvent mixtures with high electrochemical windows, preferably in excess of 5.25 volts (e.g., −3.0V to +2.25V) to prevent degradation during charging and discharging operations. One solvent with such a large electrochemical window is sulfolane. Similarly, acetonitrile also has an electrochemical window of −3.45V to +2.35V, but during testing was found to be subject to degradation by the persulfate salt created during charging. Other possible solvents include ethylene carbonate, propylene carbonate and dimethyl carbonate, and mixtures thereof, with or without sulfolane (−4.0V to +2.3V).

Lithium electrolytes suitable for the proposed high-voltage battery include various lithium salts soluble in the above non-protic solvents, preferably lithium perchlorate with a molarity of 1-2M in solution for enhanced electrochemical conductivity within the battery. FIG. 2 shows various electrolyte/salt mixtures investigated, based on which a final electrolyte of lithium perchlorate dissolved in a mixture of sulfolane with ethylene carbonate and propylene carbonate was selected for optimal performance and long cycle life. The active material of lithium sulfate and lithium persulfate was found to be insoluble in these electrolyte solvents, enabling the lithium sulfate/persulfate to be incorporated into the cathode structure without any loss by dissolution into the electrolytes used.

The inability of the lithium sulfate/persulfate to dissolve in the electrolyte solvents tested also significantly reduces self-discharge of the proposed high-voltage battery. Li-ion batteries self-discharge about 5 percent in the first 24 hours and then loses 1-2 percent per month; the protection circuit adds another 3 percent per month. A faulty separator can lead to elevated self-discharge that could develop into a current path, generating heat and, in an extreme case, initiate a thermal breakdown. Self-discharge of the proposed lithium-ion battery can be significantly reduced by impressing a negative voltage bias to the graphitic anode after charging, at a DC voltage level between the peak of the charging voltage and the highest discharge voltage, preferably between 4.85-4.95 VDC, akin to cathodic protection, with a current level in micro-amperes, preferably 2-5 μA, using a secondary DC power source.

The solid-state ionic structure of the sulfate and persulfate materials also enhances ionic conductivity of the cathode structure, enhancing fast charging and discharging rates, when suitably incorporated into mesoporous carbon matrices. Charge delocalization and distribution within the persulfate crystal structure also enhances charge storage and inter-conversion kinetics. Activation barriers for the conversion of sulfate to persulfate during charging are low, as tested, thus needing no catalysts.

Preferred anode materials for the proposed lithium-sulfate battery chemistry include graphitic anodes, or materials using silicon, tin and other materials for metallic anodes, preferably as amorphous or nanocrystalline materials.

Similar alkali-ion batteries can also be constructed from sodium sulfate/persulfate or potassium sulfate/persulfate salts as high-voltage cathode materials with suitable anode materials. The corresponding electrochemical charge/discharge reactions for the cell as a whole are:

$2Na_2SO_4 \leftrightarrow Na_2S_2O_8 + 2Na^+ + 2e^-$ Cell Voltage=4.72 V, or
$2K_2SO_4 \leftrightarrow K_2S_2O_8 + 2K^+ + 2e^-$ Cell Voltage=4.94 V Anode materials suitable for use with embodiments of the present inventive sodium-ion batteries include sodium-titanium oxide ($Na_xTi_yO_z$), including $Na_2Ti_3O_7$ or $Na_4Ti_5O_{12}$, with a hexagonal or monoclinic structure. Other suitable anode materials include rubidium, strontium, gallium, calcium or silver, used as micro-crystalline or nano-crystalline powders in suitable anode matrices, given that these elements form minimal alloy phases with sodium, minimizing crystallographic stresses and fractures when sodium is inserted or extracted. Suitable anode materials for use with embodiments of the present inventive potassium-ion batteries include sodium and rubidium metals.

Embodiments of the proposed lithium-sulfate battery can also be made into a solid-state battery, by using suitable polymeric cationic membranes, after exposure and saturation to lithium salts in aprotic solvents. Lithium ions are conducted between the anode and cathode through the cationic membrane, preventing self-discharge common in traditional liquid electrolyte-containing lithium-ion batteries. One typical polymeric cationic membrane includes polyethylene oxide (PEO) with suitable lithium salts for ionic conductivity, with or without nano-silica particles to enhance amorphicity. Similarly, polydimethylsiloxanes (PDMS) can also be used for polymeric cationic membranes, inoculated with lithium salts. Use of such membranes also reduces self-discharge of the battery.

Other suitable lithium-conducting membranes include glassy membranes like LiSICON, a lithium superconducting ionic membrane, or lithium nitride membranes. Such membranes have very high ionic conductivity for lithium, especially due to their amorphous characteristics, and also are inert to sulfate/persulfate exposure in the proposed battery system. Similar cationic membranes can also be used for sodium-ion and potassium-ion sulfate/persulfate battery systems. Use of such membranes will significantly reduce self-discharge of the lithium-ion battery system during storage.

Referring to FIG. 3, various experiments were undertaken to make a lithium-ion rechargeable battery system, using lithium sulfate as the active cathode material. Several solvents, binders and membranes were tried, before the final cell architecture was finalized and tested. Testing was performed at 1-2.5 mA charging and discharging for a 1-3 mAh coin cell battery system, at room temperature. The coin cells were assembled in a nitrogen blanket in a glove box with humidity levels of less than 25 ppm.

Low molecular weight polydimethylsiloxane was found to be an effective binder for the lithium sulfate microparticles, mixed with microscale carbon powder for electronic conductivity, as compared to PVDF binders used conventionally. It is conjectured that the siloxane converts to micro-silica, and subsequently, to lithium silicate during initial charging, yielding a fine sealing and binding agent to the lithium sulfate salt. Sulfolane, mixed with propylene carbonate and ethylene carbonate, in an 80:10:10 v/v ratio, was found to be the best electrolyte for the high-voltage battery system, using lithium perchlorate as the lithium salt for ionic conductivity. The lithium perchlorate resists oxidation, unlike other lithium salts tested (Lithium Trifluoromethanesulfonylimide, LiTFSI, and Lithium Hexafluorophosphate, $LiPF_6$). Microporous PVDF membranes (0.2 micron pore size) were a very efficient separator between the two electrodes, while maintaining sufficient solvent and lithium ion transfer during multiple charge/discharge cycling.

Referring to FIG. 4, in one embodiment, the cathode comprises finely ground, anhydrous lithium sulfate layer on a porous carbon cloth or porous carbon paper substrate (which also serves as the cathode current collector). A nanoporous polyvinilydine fluoride (PVDF) membrane serves as a separator and electrical insulator between the cathode and the anode. The anode comprises a commercially available graphite layer deposited on a copper foil (which also serves as the anodic current collector). Sulfolane was used as the ionic solvent, with lithium salts dissolved in it, like Lithium Perchlorate, Lithium Trifluoromethanesulfonylimide or Lithium Hexafluorophosphate. During charging, lithium ions are removed from the lithium sulfate matrix and transferred to the graphite by the electrolyte for intercalation into graphite. Typical charging voltages are in excess of 4.85 volts. Alternatively, a solid-state electrolyte comprising lithium-ion conducting cationic membrane can be used instead of the PVDF membrane and the sulfolane solvent.

Figure 5:
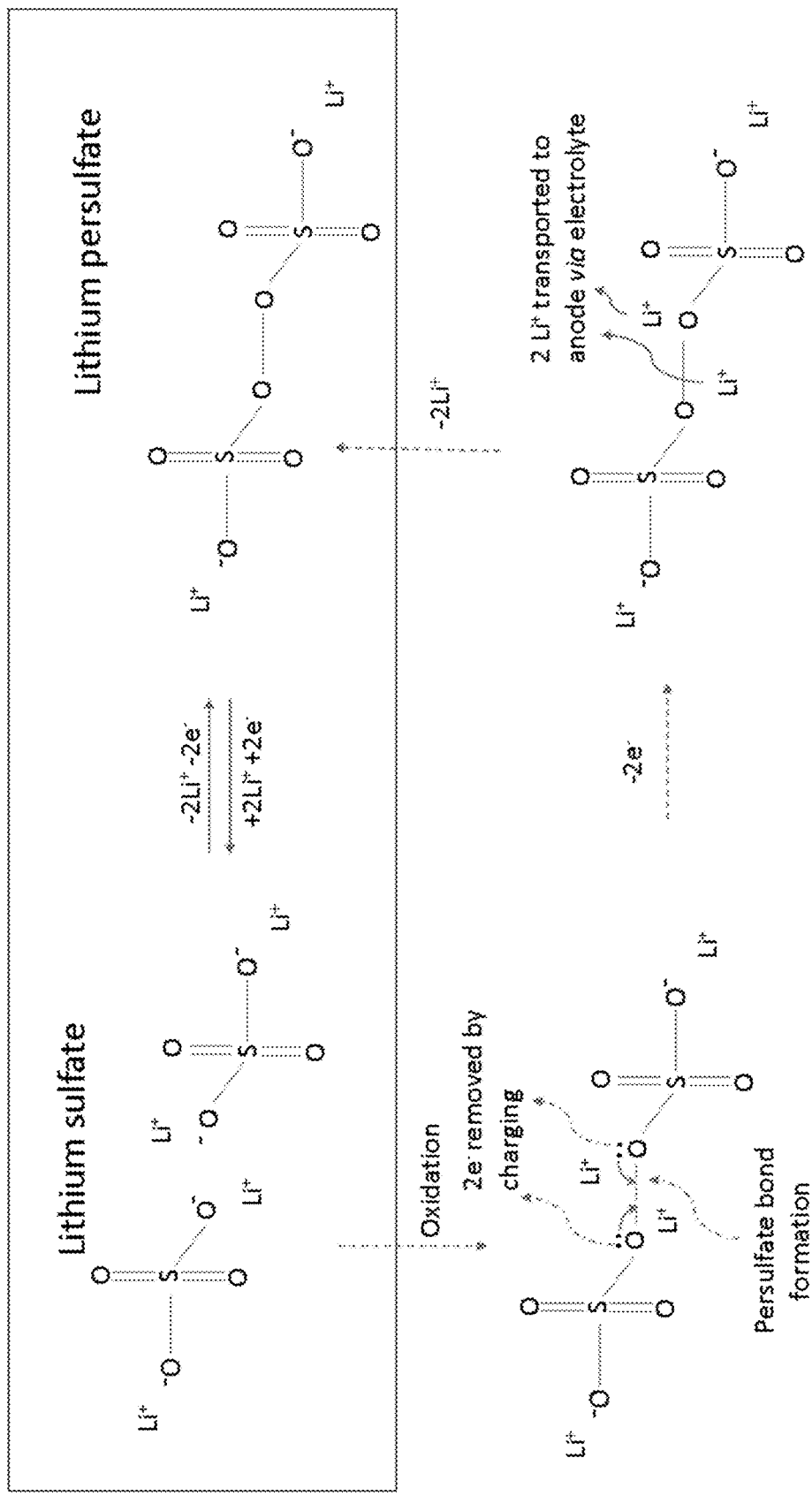
FIG. 5 shows the electro-chemical conversion of lithium sulfate to lithium persulfate.

Referring to FIG. 5, the electro-chemical conversion of lithium sulfate to lithium persulfate results in the release of lithium ions for intercalation in graphitic anodes. During charging, lithium ions and electrons are released from the lithium sulfate cathode, converting it to a lithium persulfate layer. The lithium ions travel across the lithium-containing electrolyte to the graphite anode, where they are preferentially inserted in between the graphite layers (intercalation). The electrons travel in an external circuit to the graphite electrode, completing the ionic/electrical circuit. During discharge, the reverse phenomena takes place, with lithium being de-intercalated from the charged graphite, and transferred back into lithium persulfate layer, converting it back to lithium sulfate for the next battery charge cycle.

Figure 6:
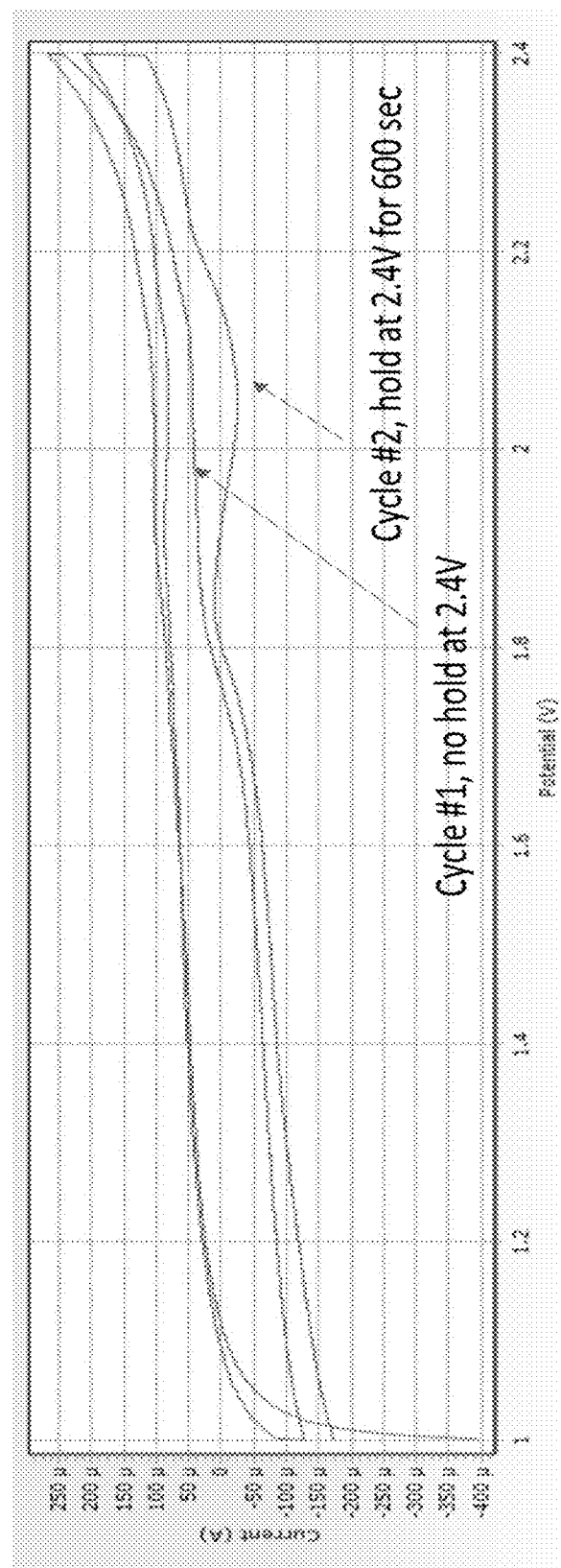
FIG. 6 shows the reversible inter-conversion of sulfate to persulfate, as tested using cyclic voltammetry techniques.

Referring to FIG. 6, the reversible inter-conversion of sulfate to persulfate is shown, using cyclic voltammetry techniques. The tests were conducted in two different modes: one as a continuous scan, and the other with a hold at 2.4 volts for 600 seconds. The latter scan shows the typical electron transfer dip, indicative of sulfate to persulfate conversion.

Figure 7:
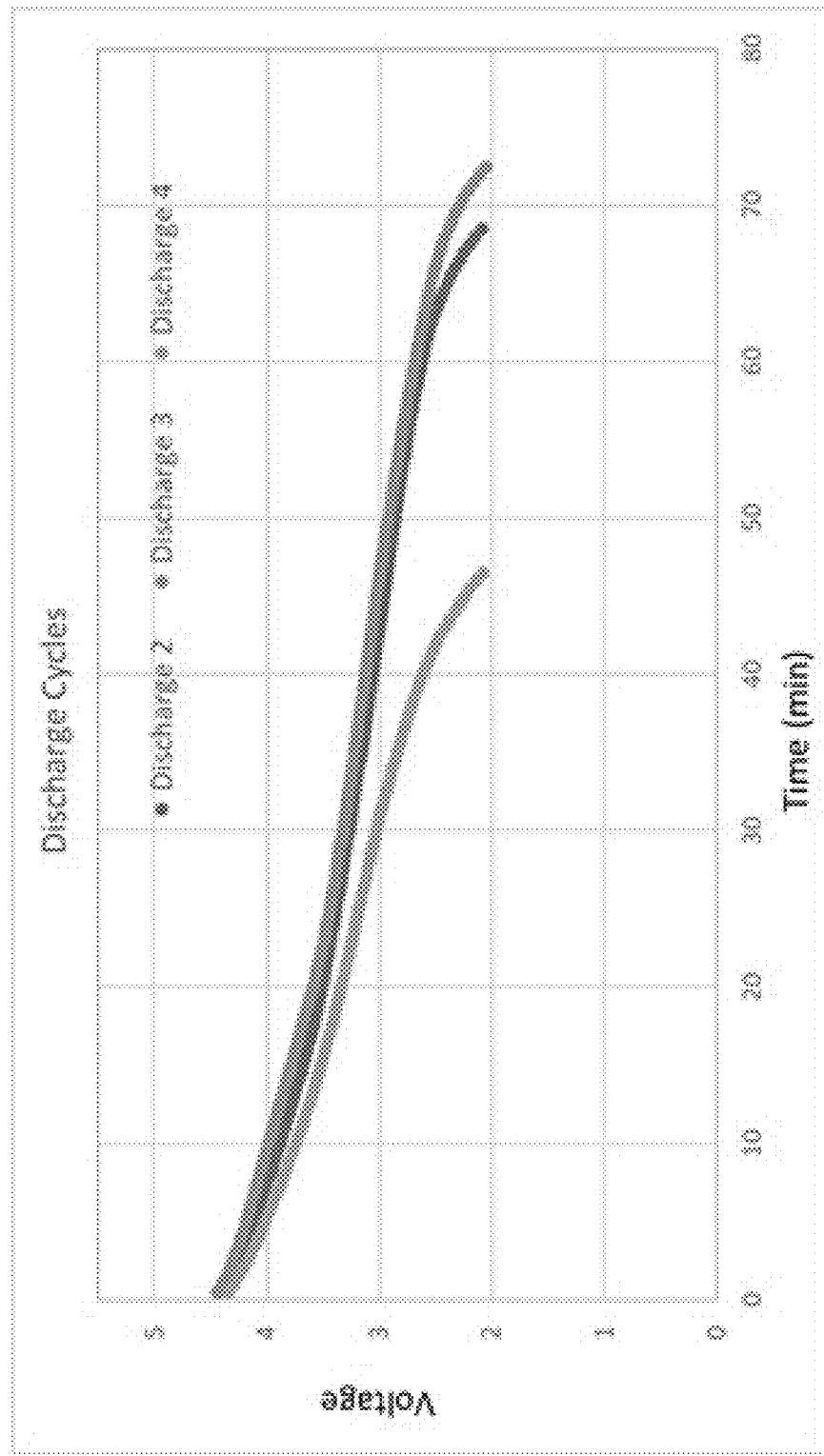
FIG. 7 shows the discharge profiles of the assembled lithium-sulfate battery system, tested over multiple cycles.

Referring to FIG. 7, the discharge profiles of the assembled lithium-sulfate battery system are shown, as tested over multiple cycles. The discharge voltage over all three cycles starts off at a voltage exceeding 4.5 volts, well in excess of current commercially available lithium-ion batteries. The discharge curve also indicates the efficacy of using sulfolane as a high-voltage lithium battery electrolyte.

Persons of ordinary skill in the art should appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. An alkali-ion battery comprising:
    a solid-state active cathode material comprising crystalline ionic alkali sulfate compounds; and
    an electrode matrix of the alkali sulfate compounds configured to be inert to oxidation by alkali persulfate:
    wherein alkali ions of the alkali sulfate compounds are extracted and inserted into an anode during charging of the battery, resulting in conversion of alkali sulfate to alkali persulfate at the cathode,
    wherein the electrode matrix stabilizes the resulting alkali persulfate in the electrode matrix, and
    wherein the alkali ions comprises lithium, sodium or potassium.

* * * * *